United States Patent
Siegel

[15] 3,692,390
[45] Sept. 19, 1972

[54] AUDIO-VISUAL DEVICE

[72] Inventor: Morton A. Siegel, Plainview, N.Y.

[73] Assignee: Kinesonic Industries Ltd., New York, N.Y.

[22] Filed: March 2, 1970

[21] Appl. No.: 15,661

[52] U.S. Cl. .....................352/17, 352/31, 352/169, 352/174
[51] Int. Cl. ........................G03b 21/38, G03b 31/04
[58] Field of Search.............352/17, 18, 169, 174, 31

[56] References Cited

UNITED STATES PATENTS

| | | |
|---|---|---|
| 3,447,864 | 6/1969 | Shadley .......................352/17 |
| 3,397,937 | 8/1968 | Schrader ....................352/169 |
| 3,489,492 | 1/1970 | Kobler.........................352/169 |
| 3,389,953 | 6/1968 | Gerry ..........................352/78 |
| 3,206,757 | 9/1965 | Schrader......................352/78 |
| 3,139,789 | 7/1964 | Schrader................352/128 X |

Primary Examiner—Louis R. Prince
Assistant Examiner—Denis E. Corr
Attorney—Kirschstein, Kirschstein, Ottinger & Frank

[57] ABSTRACT

A projector casts on a screen, from an endless loop picture film either a still image of a single frame or a moving image representing a blend of a succession of frames. The audio component accompanying the picture film is carried on an endless loop magnetic tape which additionally carries inaudible signals. The signals control an intermittently operating picture film advance. The film loop and the tape loop are both coiled in side-by-side relation in separate compartments of a twin-compartment cartridge. Separate magnetic pickups are included for the audio component and for the signals of the tape loop. The signals control a solenoid actuated detent which can stop the picture film advance at single pre-selected frames so that, when appropriate, a single frame image in the still mode is projected, while the audio accompaniment continues uninterrupted. At other times the signals permit the film to advance at the same time as the tape. Thereby, a continuous running commentary is synchronized with any mixture of still and moving pictures projected on the screen. The film advance drive includes a sleeve concentrically mounted on a rotating drive shaft. The sleeve is coupled to the rotating drive shaft by a clutch which slips when the detent engages the sleeve.

4 Claims, 12 Drawing Figures

INVENTOR.
MORTON A. SIEGEL

FIG. 6

INVENTOR.
MORTON A. SIEGEL
BY
Kirschstein, Kirschstein Ottinger & Frank
ATTORNEYS

AUDIO-VISUAL DEVICE

BACKGROUND OF THE INVENTION

1. Field of the Invention

Mixed still and moving modes of visual projection coordinated with continuous audio reproduction and with automated control of visual modes.

2. Description of the Prior Art

The use of programmed audio-visual instructional devices has become increasingly important in educational and instructional techniques. One reason for the success of such devices is their versatility. In fact, a single machine can be used to instruct in virtually any field, subject or topic by merely selecting the desired programmed pedagogical material for playback. A second reason to which the success of these devices is attributable is that the visual representations presented often are of the type not available in the classroom environment.

Another advantageous feature of these devices is that they are narrated by someone other than the instructor who is in daily confrontation with the students and provide a variety of instructional approaches in a single classroom.

Film strip (a strip of film containing successive non-blending picture frames) plays a leading role in the field of audio-visual instructional materials. Film strip devices currently in use project a light beam modulated by images on successive frames of a film strip. The strip device functions like a slide projector in that it projects an image for an appreciable time span and does not cast successive pictures on a screen so rapidly as to create an illusion of motion. A pre-recorded running commentary is coordinated with the successive frames of the strip. The more sophisticated film strip instructional devices include, with the running audible commentary, coordinating inaudible pulses which actuate an automatic mechanism for advancing the film strip from frame to frame. The most prominent disadvantage associated with film strips is that often it is desirable to include an animated visual sequence to accompany a certain portion of the audible commentary. Thus, a much more effective presentation would be achieved, for instance, if in instructing a student, the student could actually see an animated portrayal of the specific point being conveyed.

Another audio-visual instructional device is the common motion picture with sound accompaniment. This, of course, conveys to the students not only the running commentary, but an animated portrayal which achieves more effective pedagogical results. Audio-visual information conveyance would be best achieved through the use of both animated and still illustrations. Although it is possible to include still images in a motion picture, the problem encountered is that if an image in the "still" mode is to be projected and the film advance is stopped for this purpose, the audible commentary will also stop, defeating the purpose of having a prolonged commentary to convey a significant point. If, on the other hand, it is desired to have a continuous running commentary and include images in a "still" i.e. "frozen" mode, it is necessary to include a length of film wherein the images on successive frames are identical. This is a distinct disadvantage, primarily because a large quantity of film is needed to continuously project the same image. For example, assume a program of 8 minutes duration is planned, the audible commentary will continue for 8 minutes and approximately 100 feet of picture film will be required (8 mm.). If the program includes two "still" images of 2 minutes duration, one-half of the entire film length will be used to project a "stationary" image.

An approach to solving this problem has been the proposed coordination of both a moving picture projector and a slide projector. The disadvantage of that apparatus was that a single running commentary which would be continuously operating when either the movie or the slide was being projected was unavailable because the movie film sound track commentary would not continue when the movie film was not advancing.

SUMMARY OF THE INVENTION

It is an object of the present invention to provide an audio-visual device of the general character described which is not subject to the foregoing disadvantages.

More specifically it is an object of the present invention to provide an audio-visual device of the general character described which may be operated with great facility, is lightweight, portable and well suited for either individual or group applications.

A further object of the present invention is to provide an audio-visual device of the general character described which will project mixed animated and still images while maintaining an audible running commentary for images in both modes.

Yet another object of the present invention is to provide an audio-visual device of the general character described wherein a continuously driven magnetic tape provides both an audio accompaniment for a picture film which is projected in mixed still or animated modes and inaudible signals which control the mode of projection.

Yet another object of the present invention is to provide an audio-visual device of the general character described which includes means for automatically changing the projection mode from an animated image comprising a rapid progression of a succession of frames to a still image comprising a prolonged dwell at a single frame.

A still further object of the present invention is to provide an audio-visual device of the general character described which audibly and visibly depicts coordinated audio-visual programs carried in a magnetic tape-picture film cartridge and is well suited for both entertainment and tutorial purposes.

Another object of the invention is to provide a programmed audio-visual cartridge wherein coordinated endless loops of movie film and magnetic tape are each carried in separate compartments to permit the continuous movement of one loop while the other loop is intermittently advanced or stopped.

Other objects of the invention in part will be obvious, and in part will be pointed out hereinafter.

The invention accordingly consists in the features of construction, combinations of elements and arrangements of parts which will be exemplified in the audio-visual device hereinafter described, and of which the scope of application will be indicated in the appended claims.

BRIEF DESCRIPTION OF THE DRAWINGS

In the accompanying drawings in which is shown one of the various possible embodiments of the invention.

DESCRIPTION OF THE PREFERRED EMBODIMENT

The audio-visual device of the present invention utilizes a twin-compartment cartridge, each compartment carrying a different closed loop of programmed coordinated material for simultaneous viewing and hearing. The loop in one compartment is formed of magnetic tape and carries two magnetic tracks thereon, one transformable to sound and the other to a control signal. The two tracks are transduced by separate playback heads. The tracks run side by side on the tape loop. Optionally, the two tracks can be combined into a single track with the control signals constituting interposed control pulses at a supersonic frequency. The other compartment of the cartridge carries a loop of picture film bearing successive light modulating image frames. When the images of the film loop are advanced sequentially at a rapid rate past a light aperture and the image of each frame is projected, a moving picture effect is produced. The audio track in the magnetic tape carries the sound accompaniment for the portion of the film which is being viewed, whether it be still or animated. The magnetic tape is programmed to (a) stop the film at any selected single frames so as to project still images of those frames and (b) to project animated pictures. Control pulse signals carried in the control track of the magnetic tape are used to shift between animated and still modes of projection and between successive still frames while the audio reproduction continues without stopping except for pauses between visual sequences, that is to say, the audio track is continuously actuated but there preferably are gaps in the sound corresponding to the changes of visual subject matter. Synchronism between the audio and the projected images is maintained by the control track.

The audio-visual device which is utilized in conjunction with the twin-compartment cartridge includes a single drive shaft for both the tape and the film loops and an intermittent stopping mechanism for halting the film loop advance at predetermined still frames.

Figure 3:
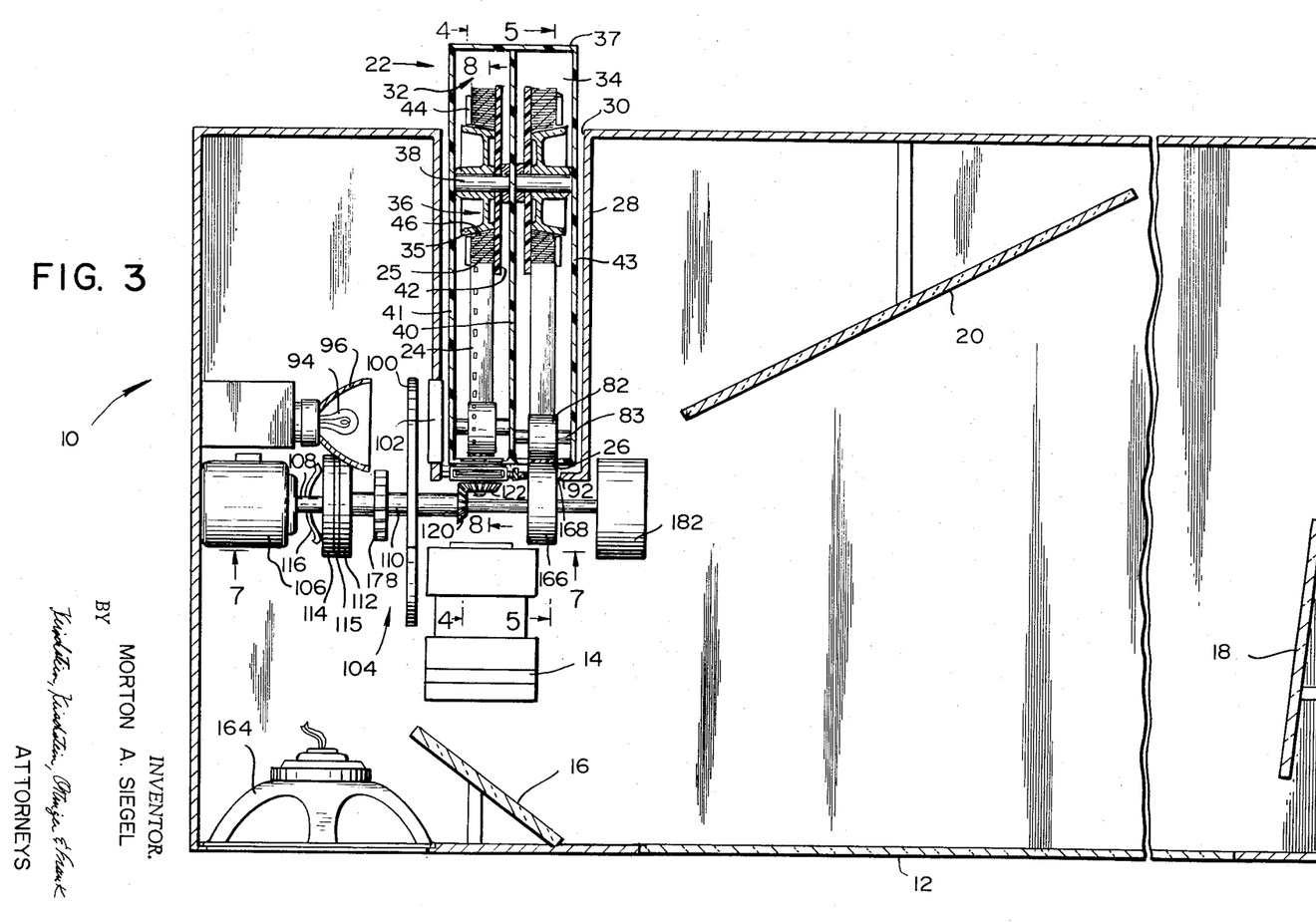
FIG. 3 is an enlarged sectional view of the device, the same being taken substantially along the horizontal plane 3—3 of FIG. 1 and illustrating the interior of the cartridge, along with several internal components of the device such as a film advance drive train, a tape capstan drive, a projection lamp reflector, a light shutter wheel, and mirrored surfaces for reflecting a film modulated light beam on the rear surface of the screen.

Referring now in detail to the drawings, the reference numeral 10 denotes an audio-visual device constructed in accordance with and embodying the invention. The device includes a translucent rear projection screen 12 mounted in the front wall thereof. Images are cast on the rear surface of the screen by a projector which includes a light source, a projection lens 14 (see FIG. 3) and a series of mirrors 16, 18, 20. The images are accompanied by a correlated sound commentary and a control for determining the mode i.e. still or moving characteristics of the images.

Each picture film is carried in one compartment of a twin-compartment cartridge 22. The subjective material (software) carried on the film and tape of a single cartridge is designed for a specific program, be it entertainment, educational, instructional, vocational training, etc.

Figure 6:
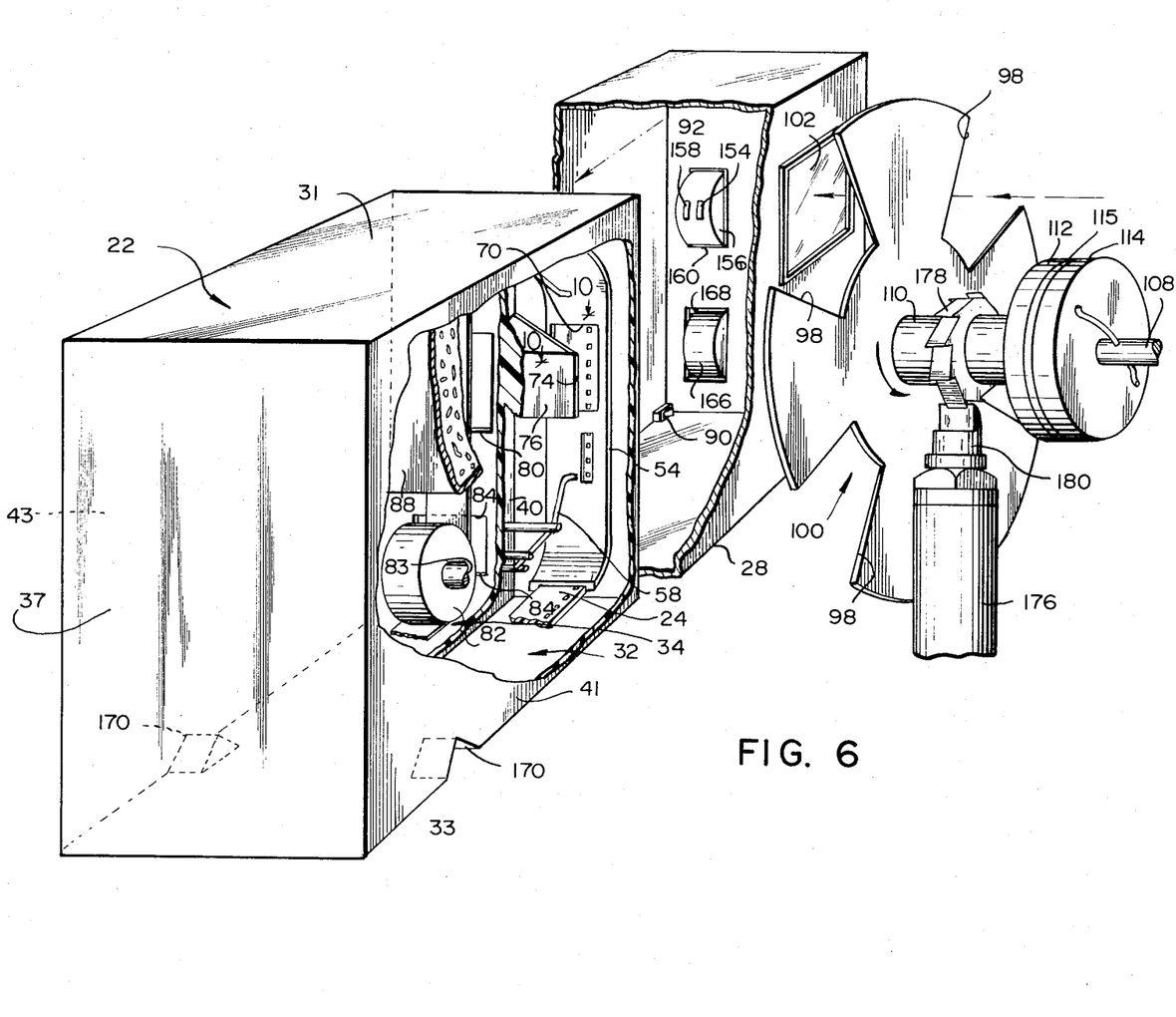
FIG. 6 is a greatly enlarged fragmentary exploded isometric view taken from the rear of the device (with the rear wall and other elements removed for clarity) and illustrating the positioning of the cartridge in a cartridge receiving sleeve; also illustrated is the light shutter wheel, and a clutch which interconnects a drive shaft with a sleeve and a solenoid operated detent positioned beneath the sleeve in engagement with a toothed wheel fixed to the sleeve to prevent the sleeve from rotating.

The coordinated visual and audio components of a selected program in the cartridge 22 are carried respectively in an endless picture film loop 24 and an endless magnetic tape loop 26 as was previously mentioned. The cartridge 22 is positioned in the audio-visual device 10 by sliding the same into a cartridge sleeve 28 (see FIG. 6) projecting inwardly from the rear wall of the device and accessible through an opening 30 in said rear wall.

The construction of the twin-compartment cartridge 22 is shown in FIGS. 3-6 and 10. The cartridge 22 includes a top wall 31, a bottom wall 33, a rear wall 37, a front wall 39 and side walls 41, 43. A parting wall 40 extends in a plane parallel to the side walls 41, 43 and divides the cartridge 22 into twin compartments 32 and 34.

The compartment 32 houses the endless picture film loop 24, a portion 25 of which is coiled on a bobbin 36, that is journalled for rotation about a spindle 38. The spindle 38 is supported by and extends from the parting wall 40. A base disc 42 is rotatably mounted on the spindle 38 adjacent the parting wall 40 and is abutted by an edge of the coiled picture film loop 24. The edges of the inner convolutions of the coil portion 25 opposite the base disc 42 are constrained about the bobbin 36 by a flat ring 44 (see FIG. 3). The ring 44 loosely engages the bobbin. It should be noted that the annular wall 35 of the bobbin 36 tapers outwardly from the parting wall 40, and that the inner diameter of the ring 44 is less than the maximum diameter of the annular wall 35 so as to captively retain the ring 44. It should also be observed that the inner diameter of the ring 44 is greater than the diameter of the annular wall 35 at the plane the ring is located, leaving a clear space. Through this clear space the innermost convolution, i.e. the convolution contracting the annular wall 35 of the film loop 24 is drawn. The film loop then extends upwardly toward the top wall 31 and the front wall 39 of the cartridge 22, and then over a positioning pin 50 which projects perpendicularly from the parting wall 40. The film loop 24 is threaded in a track 52 (see FIG. 10) formed in the front wall 39. In order to hold the film loop 24 flat against the track 52, an elongate pressure plate 54 is provided. The pressure plate 54 includes a curved portion at its upper end which leads the film loop 24 into the track 52. A mating track 56 is formed in the pressure plate 54 so that the film is snugly held against the front wall 39. The pressure plate 54 is resiliently held in a position abutting the front wall 39 by a plurality of wire springs 58 (see FIGS. 4 and 8) which are biased toward the front wall 39 and are mounted on posts 60 which extend perpendicularly from the parting wall 40.

An idler wheel 62 is positioned beneath and inwardly of the pressure plate 54 and guides the film loop 24 in a return passage to form the outer convolution of the coiled portion 25. The idler wheel 62 is journalled for rotation on a shaft 64 extending between the parting wall 40 and the side wall 41 of the compartment 32. The idler wheel 62 includes a plurality of sprocket pins which engage mating sprocket holes in the film loop 24, to aid in tracking the picture film. A slight frictional drag between the wheel 62 and the shaft 64 prevents unravelling of the convolutions of the coiled portion.

The front wall 39 includes two apertures 66, 68. The uppermost aperture 66 is a projection aperture which permits the passage of a light beam modulated by pictures on the film loop 24 into the projection lens 14 which beam is reflected by the mirrors 16, 18 and 20 onto the screen 12.

The lower aperture 68 permits the engagement of the sprocket holes in the film loop 24 by a film advance mechanism (to be later described) for the intermittent advancement of successive picture frames of the film loop 24 past the projection aperture 66.

It will be appreciated that a film advance mechanism will draw the film loop 24 through the tracks 52, 56 from the inner convolution of the coiled portion 25, causing the bobbin 36 to rotate. Simultaneously the recently projected portion of the film loop is fed to the outer convolution of the coiled portion 25.

Returning to the projection aperture 66, the same is located in the front wall 39 toward the upper portion of the cartridge 22. An aperture 70 in the pressure plate 54 is located behind and in registry with the aperture 66. In order to allow a light beam to pass through and be modulated by picture frames of the film loop 24, a light admittance aperture 72 is formed in the side wall 41 of the cartridge 22. The light admittance aperture 72 (see FIG. 10) is at the same elevation as the projection aperture 66, and since the side wall 41 is perpendicular to the front wall 39, the light admittance aperture 72 lies in a plane perpendicular to the plane of the aperture 66. A mirror 74 is positioned at the same elevation as the apertures 66 and 72, and at a 45° angle to both apertures. The rear of the mirror 74 is mounted on a block 76 which projects from the parting wall 40. A light beam may thus pass from a projection bulb through the aperture 72 to be reflected off the mirror 74 and through a picture frame of the film loop.

Figures 1, 2, 4, 5:
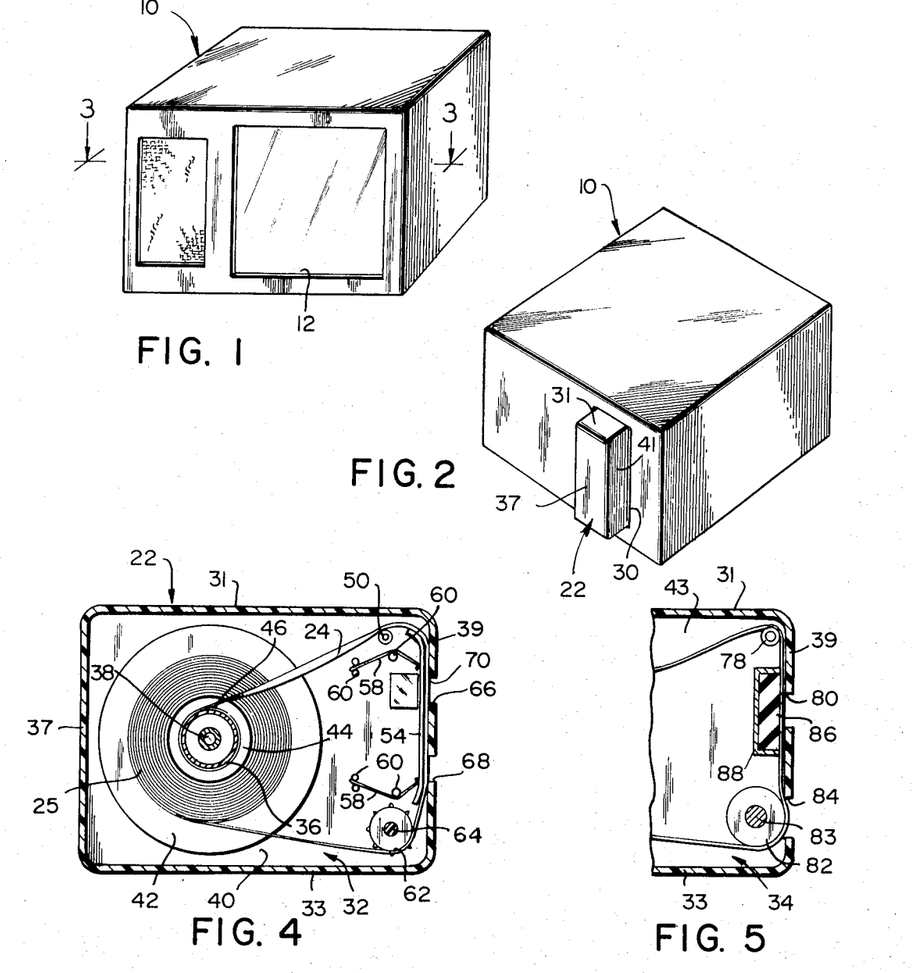
FIG. 1 is a front perspective view of an audio-visual device constructed in accordance with and embodying the invention, and showing a projection screen and speaker grille positioned in the front wall of the device.
FIG. 2 is a rear perspective view of the audio-visual device, and showing a portion of a cartridge projecting from the rear wall of the device and mounted in a sleeve extending inwardly from the rear wall.
FIG. 4 is a sectional view through the film carrying portion of the cartridge, the same being taken substantially along the line 4—4 of FIG. 3.
FIG. 5 is a fragmentary sectional view through the magnetic tape carrying compartment of the cartridge, the same being taken substantially along the line 5—5 of FIG. 3.
Figures 7, 8, 9, 10:
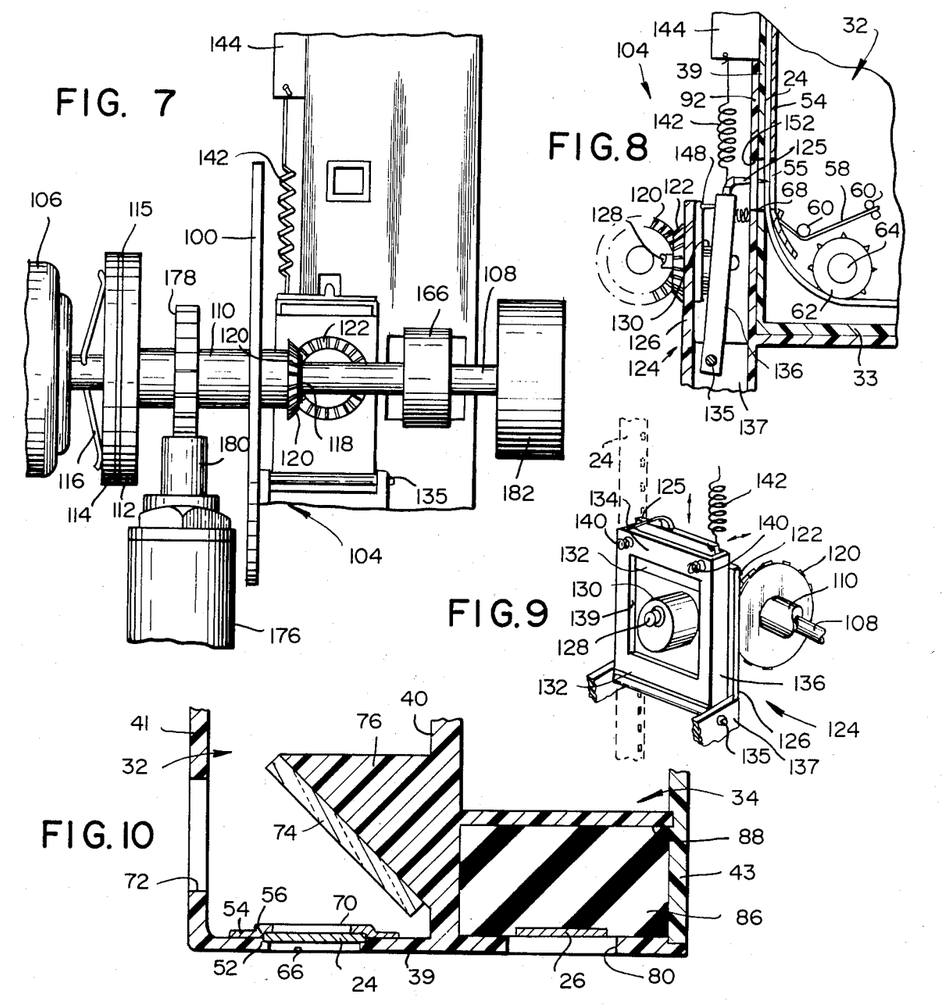
FIG. 7 is an enlarged fragmentary sectional view of the interior of the device, the same being taken substantially along the line 7—7 of FIG. 3 and illustrating the film advance drive train including the clutch, the rotatable sleeve and the detent mechanism.
FIG. 8 is an enlarged fragmentary sectional view, the same being taken substantially along the line 8—8 of FIG. 3 and showing the film advance mechanism and portions of the interior of the film carrying compartment of the cartridge.
FIG. 9 is an enlarged rear perspective view of the film advance mechanism and showing, in dashed lines, the relative position of the film.
FIG. 10 is a greatly enlarged fragmentary sectional view through the front of the cartridge, the same being taken substantially along the line 10—10 of FIG. 6 and showing a light reflecting mirror positioned between light-passing apertures in perpendicularly oriented walls in the film carrying portion of the cartridge; also shown is a pressure plate which holds the film flat in back of the light-passing aperture in the front wall of the film carrying compartment and a resilient pad which holds the magnetic tape flat in back of an aperture in the front wall of the tape carrying portion.

The sound accompaniment for the picture projected on the screen 12 from the film loop is carried by the endless magnetic tape loop 26 which is housed in the tape compartment 34 of the cartridge 22. The tape compartment 34 includes a bobbin, spindle, base disc and flat ring which are of the same construction as that of the film compartment 32. The tape compartment 34 is distinguished from the film compartment, however, adjacent the front wall 39. The distinguishing features are illustrated in FIGS. 5 and 10 and basically comprise guides and a path for steadily advancing (non-intermittently) the magnetic tape loop 26 past pick-up heads and a means for engaging the magnetic tape with a driving capstan. For the above purpose, a post 78 projects from the parting wall 40 toward the side wall 43 of the compartment 34, the magnetic tape loop 26 being guided over said post. The tape loop 26 then lies flat against the interior surface of the front wall 39 and passes a pick-up aperture 80 formed in the front wall. Subsequently the tape loop 26 is guided around an idler wheel 82 which is journalled for rotation (about a spindle 83 mounted rearwardly of the front wall 39) and projects partially into a capstan aperture 84 formed in the front wall 39. A resilient pad 86 positioned behind the tape loop 26 in a compartment 88 (see FIGS. 6 and 10) biases the tape towards the pick-up aperture 80 so that the magnetic tape will be in engagement with a magnetic pick-up head.

As was previously mentioned, the twin compartment cartridge 22 includes a suitable audio-visual program carried on the tape loop and the picture film loop and the entire cartridge 22 is inserted through the opening 30 in the rear wall of the device 10 and into the cartridge sleeve 28. The cartridge engages a normally open switch 90 adjacent the front wall 92 of the sleeve 28 to automatically actuate the device 10 when the cartridge 22 is fully seated in the sleeve 28. The switch 90 closes a circuit leading to a projection lamp 94. The projection lamp 94 is of any commercially available type, e.g. a heat dissipating dichroic coated Quartzline lamp, and is mounted within a parabolic reflector 96 (see FIG. 3). The light beam from the projection lamp 94 passes through cutaway portions 98 of a light shutter wheel 100 (see FIGS. 3 and 6). The light shutter wheel rotates in synchronism with the intermittent film advance to block the illumination of the film while the film is being advanced between successive frames in a manner to be subsequently described. The light beam then passes through a transparent heat dissipating shield 102 mounted in an aperture in the side wall of the cartridge sleeve 28. The heat dissipating shield 102 prevents heat damage of the film loop 24 when a single picture frame is projected over an extended period, e.g. 2 minutes.

It will be readily observed that the light beam travels from the projection lamp 94 through the cutaway portions 98 of the light shutter wheel 100, through the heat dissipating shield 102 and through the light aperture 72, whereupon it strikes the mirror 74. The light beam is reflected from the mirror 74 and projected through the aperture 70 in the pressure plate 54 and through the then unmoving picture frame of the film loop 24. The beam is thereby modulated by the picture frame and the modulated beam is projected through the projection aperture 66 into the projection lens 14 to be reflected by the mirrors 16, 18, and 20 onto the projection screen 12.

The film advance mechanism 104 includes a synchronous motor 106 (see FIGS. 3 and 7) which rotates a drive shaft 108. It should be noted that the motor 106, drive shaft 108 and projection lamp 94 are all set into continuous operation when the cartridge 22 is inserted into the sleeve 28 and engages the switch 90. The mechanism 104 includes a power take-off from the drive shaft 108 and a detent for holding a single frame of the film 24 at the light aperture 66 (for projection of the image in a still mode).

The power take-off comprises a sleeve 110 rotatably mounted on the drive shaft 108. Fixed to one end of the sleeve 110 is a clutch plate 112, and a mating clutch plate 114 is fixed to the drive shaft. The plate 114 is biased against the plate 112 by a spring 116 carried by the drive shaft. A friction pad 115 is secured to the sleeve clutch plate 112. The engagement between the plates 112 and 114 will cause the sleeve 110 to rotate when the shaft 108 is turned. However, the clutch plates are designed to slip when the sleeve 110 is prevented from rotating as will be subsequently described. A C-clip 118 is mounted on the drive shaft 108 in a groove therein and contacts the distal end of the sleeve 110 (opposite the clutch plate 112) to prevent axial movement of the sleeve 110. The shutter wheel is mounted on the sleeve 110.

A bevel gear 120 is secured on the distal end of the sleeve and engages a mating bevel gear 122 to drive a film advance claw mechanism 124 (see FIGS. 3, 7, 8 and 9). The claw mechanism 124 includes a tooth 125 which is thrust through one after another of the sprocket holes in the picture film loop 24 to intermittently pull the film past the projection aperture 66 a single frame at a time. A vertical plate 126 is fixedly supported in a plane parallel to the front wall 92 of the sleeve 28 and is spaced forwardly from said front wall. The driven bevel gear 122 is fixed to a shaft 128 which is journalled in an aperture in the vertical plate 126. Adjacent the other (rearward) end of the shaft 128 is a circular cam 130 (see FIG. 9) which is positioned within a rectangular slot 132 formed in a vertically reciprocating slider 134. The slider 134 is mounted in an open topped track 136 constructed of a tubular channel of rectangular cross section with cut out portions 139 on each face. The track 136 is mounted for rotation about a horizontal axis at its base (see FIG. 8). The pivotal connection for the track 136 is effected by a horizontal pin 135 which is fixed in a bore in the track. The protruding ends of the pin are journalled for rotation in openings of opposed flanges 137 which project forwardly from the front wall of the sleeve 28. The forward ends of the flanges 137 are joined to the vertical plate 126 so that the plate 126 is spaced from the front wall 92 and the track 136 will pivot about the pin 135 between the front wall 92 and the plate 126. The ends of the pin 135 are peened for captive retention. The track 136 is biased away from the front wall 92 of the sleeve 28 by two helical coil compression springs 140 positioned between the front wall 92 and the track 136.

It will be noted from observation of FIG. 9 that that cam 130 is eccentric with respect to the shaft 128, and therefore the cam 130 will cause vertical reciprocal movement of the slider 134 within the track 136. It should also be noted that the maximum distance between the single high point of the cam 130 and the axis of rotation of the shaft 128 is less than half the width of the rectangular slot 132 so that rotation of the cam will not result in sidewise movement of the slider 134.

A tension spring 142 extends between the slider and an abutment 144 projecting forwardly of the front wall 92 of the sleeve. The spring urges the slider upwardly so that the bottom edge of the rectangular slot 132 is in continuous contact with the cam. Rotation of the cam thus results in vertical reciprocal movement of the slider 134. At the upper end of the slider 134 is the sprocket hole engaging tooth 125 which intermittently pulls the film frames past the projection aperture 66 by engaging successive sprocket holes in the film loop 24.

The film advance claw mechanism 124 additionally includes a means whereby the sprocket hole engaging tooth 125 will move into and out of engagement with successive sprocket holes in a fashion such as to only engage a sprocket hole on a downstroke. This is achieved by use of a disc 148 secured to the shaft 128 and positioned between the vertical plate 126 and the track 136. An elongate concentric face cam 150 formed on a surface of the disc (see FIG. 8) intermittently forces the track 136 forwardly towards the front wall 92 causing the same to pivot about the pin 135.

The action of the cam 150 is synchronized with that of the cam 130 and the stroke of the slider 134 so that the tooth 124 is forced inwardly into a sprocket hole at the top of the stroke of the slider just before the slider begins the downstroke. When the downstroke is completed the cam 150 has rotated past the track 136 which thereupon is forced towards the vertical wall 126 by the springs 140. The tooth 125 is thus swung out of engagement with the sprocket holes. On the upstroke of the slider, the tooth 124 is out of engagement with the sprocket holes. In order to render the sprocket holes accessible to the tooth 125, for the full length of the downstroke, an aperture 152 is provided in the front wall 92 of the sleeve 28 which aperture is in alignment with the film advance aperture 68 in the front wall 39 and an aperture 55 in the plate 54.

As is conventional, the length of the downstroke is equal to the length of a single frame on the picture film loop 24 and the light shutter wheel is coordinated with the film advance claw mechanism 124 so that the modulated light beam is blocked during the downstroke.

As was previously described, the sound accompaniment for the projected images on the screen 12 is carried on the endless magnetic tape loop 26 which is housed within the tape compartment 34 of the cartridge 22. The audio-visual device 10 audibly reproduces the sound component of the tape loop 26 through a tape playback mechanism which includes an audio track tape pick-up head 154 mounted in a tape head housing 156. The housing 156 additionally carries an inaudible track, i.e. pulse signal, pick-up head 158. The tape head housing 156 projects into the cartridge sleeve 28 through an opening 160 in the front wall 92 and includes a mounting flange which overlies the side edges of the opening 160 on the front face of the wall 92.

Figure 11:
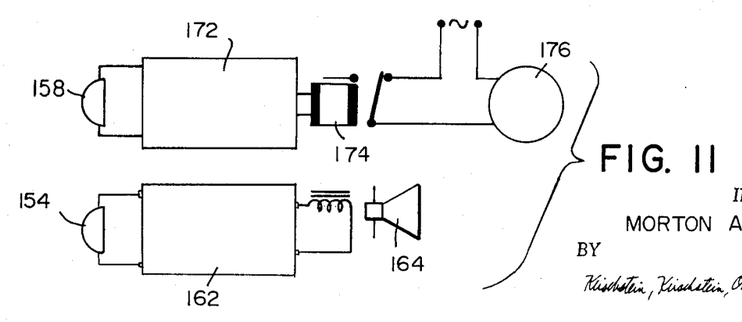
FIG. 11 is a simplified schematic drawings of the circuits employed in conjunction with the magnetic tape and illustrates a first pick-up head and amplifier feeding an audio signal to a speaker and a second pick-up head and amplifier controlling a relay to actuate the solenoid detent responsive to signals in the tape.

The audio track tape pick-up head 154 feeds audio frequency electrical signals through leads to a sound track amplifier 162 (see FIG. 11), the output of which is connected to a speaker 164 which reproduces the sound accompaniment for the illustration projected on the screen.

To drive the tape loop 26 at a reproduce speed which coincides with the recording speed, e.g. 1 ⅞ i.p.s. a capstan wheel 166 is secured to the drive shaft 108 and rotates therewith. A flywheel 182 is mounted at the distal end of the drive shaft 108. The capstan wheel 166 projects into the cartridge sleeve 28 through an opening 168 (see FIG. 6) in the front wall 92. The opening 168 is in alignment with the capstan aperture 84 in the front wall 39 of the cartridge 22.

It will be observed that when the cartridge 22 is inserted into the sleeve 28, the capstan wheel 166 will engage that segment of the tape loop 26 which is then riding on the front of the idler wheel 82. In order to maintain the capstan wheel in firm engagement with the tape loop 26 and the idler wheel 82, notches 170 are formed in the bottom wall 33 of the cartridge 22. These notches are engaged by spring clips (not shown) which project upwardly from the bottom of the cartridge sleeve 28 when the cartridge 22 is seated in the sleeve 28 and which bias the cartridge forwardly.

An important feature of the invention is the ability to automatically stop the film loop 24 for an extended period of time with a selected image being projected through the light aperture 66. It was previously mentioned that signals for controlling the film playback image mode, i.e. moving or still images, are carried in a track of the tape loop 24 which is separate from the audio track on said loop. These signals are converted from magnetic to electrical signals by the signal track pick-up head 158. The pick-up head 158 feeds the electrical signals to an amplifier 172 (see FIG. 11) which, in turn, activates a relay 174 that energizes a solenoid 176. The solenoid 176 is mechanically connected to a detent mechanism for stopping the film advance. While the precise linkage for stopping the film advance at a given pulse signal is not of great importance and does not form part of the present invention, a suitable mechanism is described below.

The film advance stopping mechanism includes a ratchet 178 which is secured on the sleeve 110. The solenoid 176 is mounted beneath the drive shaft 108 and in a plane passing through the axis of the drive shaft.

Attached to the upper end of the solenoid armature is a detent 180. The armature is spring-biased upwardly to a position wherein the detent 180 is forced against the ratchet 178 (see FIGS. 6 and 9) so that when the solenoid is idle it prevents the sleeve 110 from rotating.

With the cartridge 22 seated in the sleeve 28, the motor 106 will be rotating the drive shaft 108 and, with the solenoid 176 in idle position, the clutch plates 114 and 112 will slip so that the drive shaft 108 and capstan 166 will rotate; thus, only the tape loop 26 will be advancing. When a suitable pulse signal carried on the magnetic tape loop 26 reaches the head 156, the relay 174 will be actuated, completing an electrical circuit to the solenoid 176 to energize the same and pull the detent 180 out of engagement with the ratchet 178. Now the sleeve 110 is free to rotate and the clutch plates 112, 114 no longer slip. When the sleeve 110 rotates, the gear 120 drives the film advance claw pull mechanism 124 to intermittently advance successive film frames past the light aperture 66. Upon a subsequent pulse signal or a discontinuance of the first pulse signal, the relay 174 will deactivate the solenoid 176, and the detent 180 will be forced against the ratchet 178 to stop the film advance.

Figure 12:
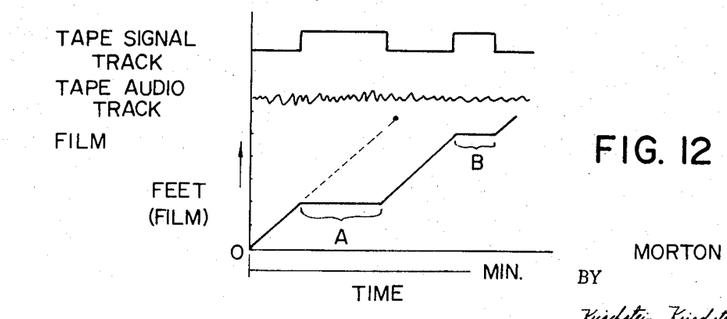
FIG. 12 is a comparative chart indicating the audio and signal tracks carried by the tape and the film footage associated with such tracks, the same being shown with respect to a time base.

Attention is now directed to FIG. 12 wherein a graphic portrayal of the operation of the device 10 is depicted. The top, generally horizontal line represents the signals carried in the control tape track and the lowermost portions of that line indicate solenoid energizing signals which, when they pass the head 156, retract the detent from engagement with the ratchet 178. The uppermost portions of that line indicate solenoid deenergizing signals which, when they pass the head 156, release the relay to deactivate the solenoid and permit a spring associated with the detent to snap the detent against the ratchet to halt the advance of the film essentially instantaneously, i.e. at the frame then approaching and at rest in front of the projection aperture 66.

The generally horizontal line depicted beneath the upper line represents the sound track on the tape loop 26. This track continues throughout the full length of the program which, for instance might be 8 minutes. The lowest line representation is that of the film footage passing the projection aperture 66.

Initially it will be observed that if the control track had no signals for deenergizing the solenoid, the film footage would be completely exhaused (see dashed line projection on film footage line) at the end of approximately 4 minutes (which is the average time for 50 feet of 8 mm. movie film).

With the use of mixed control signals as illustrated in the uppermost graph, there are periods during which the tape loop 26 is advancing to project a moving picture, and there are periods wherein the control signal actuates the solenoid to prevent the advancement of the film and project a still image of a single frame on the screen. These still image intervals are indicated with the letter designations A and B, and are enclosed in brackets in the graph. It will be observed that with two intervals wherein two different single frames are held at the projection aperture for an extended time, the same amount of film, e.g. 50 feet, may be used for a continuous audio-visual program having a duration of 8 minutes or double the normal cycle for a continuously running film loop.

Thus it will be seen that there is provided an audio-visual device with coordinated visual modes which achieves the various objects of the invention, and which is well adapted to meet the conditions of practical use.

As various possible embodiments might be made of the present invention, and as various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. An audio-visual device comprising in combination a projector and a cartridge housing, said cartridge housing having a picture vehicle therein, said picture vehicle including a plurality of picture frames certain of which are adapted to be projected in an animated mode and others in a still mode, a sound vehicle in said cartridge housing, the sound vehicle carrying a pre-recorded sound track having a commentary for animated and still mode frame images on the picture vehicle, the sound vehicle carrying control signals coordinated with the animated and still mode frame images, the projector including means for projecting images from the picture vehicle in an animated mode or a still mode, sound reproducing means for converting into audible sound the pre-recorded commentary from the sound track carried on the sound vehicle, the means for projecting images including means for driving the picture vehicle in the cartridge housing, the sound reproducing means including means to continuously drive the sound vehicle in the cartridge, the projector further including mode selection means to control the mode of the projected images, said mode selection means responsive to the control signals to render ineffective the means for driving the picture vehicle in the cartridge housing without affecting the means for continuously driving the sound vehicle in the cartridge whereby an audio-visual program is presented with a continuously running sound commentary accompanying projected images in the animated and still modes, said projector including a light source and a projection lens, the beam of light as it is directed away from said light source and the optical axis of the projection lens being perpendicularly oriented, the cartridge having two walls perpendicularly oriented, said cartridge carrying the picture vehicle with the picture vehicle lying flat against one of said walls, means forming aligned apertures in said walls, the cartridge further including a mirrored surface internally of the cartridge housing, means mounting said mirrored surface at the same elevation as the apertures and at a 45° angle toward both walls, the light source being registered with one of the apertures whereby a light beam passes through the one aperture and is reflected by the mirror to strike the picture vehicle with the image modulated beam passing through the other aperture.

2. An audio-visual playback device constructed in accordance with claim 1 wherein the cartridge is separated into two compartments, the picture vehicle being housed in one of the compartments, the sound vehicle carrying the pre-recorded sound track and control signals being a magnetic tape, said magnetic tape being housed in the other compartment.

3. A packaged visual program, said program comprising a cartridge, a parting wall in the cartridge, the parting wall dividing the cartridge into two side-by-side compartments, a picture film in one of said compartments, said picture film having a series of picture frames certain of which are adapted to be projected in an animated mode and others of which are adapted to be projected in a still mode, means mounting said film for movement in said housing, said picture film compartment including a pair of intersecting walls, means forming first and second aligned apertures in said walls, the first aperture being formed in one wall and the second aperture being formed in the other wall, means holding a portion of the picture film flush against the one wall and over the first aperture, the picture film compartment further including a mirrored surface, means mounting said mirrored surface at the same elevation as the apertures and angularly inclined toward both walls whereby a beam of light may be projected into the cartridge through one of the apertures, modulated by a frame image on the film and projected out of the cartridge through the other aperture, a magnetic tape carrying a pre-recorded sound track having a commentary for animated and still mode frame images on the picture vehicle, said magnetic tape also carrying control signals, said magnetic tape being housed in the other compartment, means mounting said magnetic tape for movement in the other compartment, the other compartment further including a wall, means forming an aperture in said last-mentioned wall, means holding a portion of the magnetic tape over the last-named aperture so that the commentary and control signals carried thereon may be sensed by a sensing means, said picture film mounting means and said magnetic tape mounting means being independent of each other so that the magnetic tape can be driven continuously to provide a running commentary while the picture film is held stationary while projecting a still image to which the running commentary is applicable and can also project a running commentary while the picture film is moving to project in an animated mode.

4. An audio-visual device comprising a projector and a cartridge housing, said cartridge housing having a picture vehicle therein, said picture vehicle including a plurality of picture frames certain of which are adapted to be projected in an animated mode and others in a still mode, a sound vehicle in said cartridge housing, the sound vehicle carrying a pre-recorded sound track having a commentary for animated and still mode frame images on the picture vehicle, the sound vehicle carrying control signals coordinated with the animated and still mode frame images, a single drive means, sound reproducing means including means for converting into audible sound the pre-recorded commentary on the sound track carried on the sound vehicle and including means for continuously driving the sound vehicle in the cartridge from the drive means, the projector including means for projecting images from the picture vehicle in an animated or a still mode and mode selection means to control the mode of the projected images, said mode selection means including means responsive to the control signals to selectively enable the picture vehicle in the cartridge housing to be driven by the drive means and to remain stationary independent of the drive means without, in the latter condition, affecting the means for continuously driving the sound vehicle whereby an audio-visual program with a continuously running sound commentary accompanying projected images in the animated and still modes is provided.

* * * * *